(12) United States Patent
Hicks, III

(10) Patent No.: US 6,304,573 B1
(45) Date of Patent: *Oct. 16, 2001

(54) METHOD AND APPARATUS FOR TRANSMITTING AND RECEIVING ELECTRONIC VOICE MESSAGES

(75) Inventor: John Alson Hicks, III, Ocean, NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/832,252

(22) Filed: Apr. 3, 1997

(51) Int. Cl.[7] .................................................. H04L 12/56
(52) U.S. Cl. ........................................ 370/401; 370/428
(58) Field of Search .................................. 455/412, 413, 455/414; 370/474, 401, 402, 428, 356; 379/88, 67

(56) References Cited

U.S. PATENT DOCUMENTS

| | | | |
|---|---|---|---|
| 4,630,262 | * 12/1986 | Callens et al. | |
| 5,557,659 | * 9/1996 | Hyde-Thomson | 379/88 |
| 5,675,507 | * 10/1997 | Bobo, III | 364/514 |
| 5,768,513 | * 6/1998 | Kuthyar et al. | 395/200.34 |
| 5,850,433 | * 12/1998 | Rondeau | 379/201 |
| 5,884,160 | * 3/1999 | Kanazaki | 455/413 |
| 5,963,618 | * 10/1999 | Porter | 379/88.17 |
| 5,995,830 | * 11/1999 | Amin et al. | 455/423 |
| 6,014,427 | * 1/2000 | Hanson et al. | 379/67.1 |

FOREIGN PATENT DOCUMENTS

| | | |
|---|---|---|
| 0 631 419 | 12/1994 | (EP) . |
| 0 722 240 | 7/1996 | (EP) . |
| WO 92/14314 | 8/1992 | (WO) . |

* cited by examiner

*Primary Examiner*—Douglas Olms
*Assistant Examiner*—Ken Vander Puye

(57) ABSTRACT

A method and apparatus for communicating voice messages. An electronic voice mail (EVM) server receives a recipient and target device selection over a packet-switched network A sender records a voice message for delivery to the intended recipient. The voice message is stored as an audio file at the EVM server. The recipient is notified that they have received a voice message. The audio file is delivered to the target device over the packet-switched network.

33 Claims, 5 Drawing Sheets

METHOD AND APPARATUS FOR TRANSMITTING AND RECEIVING ELECTRONIC VOICE MESSAGES

FIELD OF THE INVENTION

The invention relates generally to voice messaging. More particularly, the invention relates to a method and apparatus for sending an electronic voice message over a network.

BACKGROUND OF THE INVENTION

Communication between people can take many forms, ranging from personal conversations to books, written messages, or even hand and body signals. Recently, the development of computers and telecommunications systems have provided a whole new paradigm for communications. The public telephone system now permits one person to speak with another without any geographical limitations. The advent of the facsimile machine provides a means of sending a copy of a physical document anywhere in the world.

In addition to real-time communications such as phone conversations, computers and telecommunications systems offer several forms of electronic messaging. These systems permit a sender to leave a message for a recipient, wherein the recipient can respond to the message at his or her convenience As a result of the convenience and reliability of electronic messaging systems, the use of such systems is on the rise. Although the greatest increase in the use of these systems is in the business sector resulting from the increased mobility required for many business people in today's global marketplace, electronic messaging is increasingly becoming popular for personal use in many homes.

Voice mail service is a very successful form of electronic messaging which utilizes circuit switched telephone technology and the public switched telephone network (PSTN) for message transport. In general, voice mail systems are relatively easy to use and offer a comfortable medium of communications for most people. The user interface for voice mail service primarily consists of system generated voice prompts and the use of the telephone touchtone dialpad for user control inputs. The problem with voice messaging, however, is that it is relatively expensive. Typically, the calling party incurs the network expense of creating and leaving the message. This cost can be high if it involves a call across the country or an international connection.

Electronic mail ("e-mail") is another successful form of electronic messaging. To create an e-mail message, a sender typically uses a computer keyboard to type in a recipient's name and e-mail address, a subject line, and the main body of the message. The message is then transported over a data network and delivered to the recipient. The advantages of e-mail service are that it is a very cost effective and efficient form of electronic messaging. The disadvantages are that the user interface is more complicated compared to voice messaging, and it usually requires the use of a keyboard to create the message.

E-mail is becoming increasingly popular despite the above-mentioned limitations. This popularity is due partly to the Internet, which comprises a vast, sprawling collection of networks spanning the world. The ubiquity of the Internet greatly increases the number of users available for sending and receiving e-mail messages. Furthermore, Internet access is relatively inexpensive (typically a nominal monthly fee). As a result, Internet offers a very cost efficient transport medium for delivering e-mail messages to a large number of users.

There is, however, a growing segment of Internet users who are not able to utilize Internet e-mail services In an effort to make the information and services available on the Internet and world wide web (WWW) more accessible to home users, non-PC based technology has been developed to access the Internet. This technology is generally referred to as Consumer Internet Appliances, one implementation of which is referred to as "Internet TV" or "Web TV". Internet TV is the concept of providing Internet access and services to non-PC users via low-cost TV/set-top box combinations and other non-PC devices. The user experience would be "TV-like" and Internet complexity would be concealed from the end-users. The user controls for a basic Internet TV service are likely to be the addition of a few buttons to an infrared TV remote control.

The problem with Internet TV, however, is that the basic service typically does not include a computer keyboard. Thus, a potentially large segment of Internet TV users would be unable to utilize electronic messaging in the form of e-mail services via the Internet. For many Internet TV owners, the need for a keyboard to access e-mail services would increase the overall cost of the Internet TV system. A keyboard would also increase the complexity and therefore convenience of accessing the Internet and WWW. This would be in direct opposition to an underlying service concept of Internet TV, which is to make non-technically oriented users as comfortable as possible in accessing the Internet.

In view of the foregoing, it can be appreciated that there exists a substantial need for a new form of electronic messaging service which combines the ease of use of voice mail services with the low cost of e-mail services via the Internet.

SUMMARY OF THE INVENTION

These needs and other needs are met through a method and apparatus for communicating voice messages. An electronic voice mail (EVM) server receives a recipient and target device selection over a packet-switched network. A sender records a voice message for delivery to the intended recipient. The voice message is stored as an audio file at the EVM server. The recipient is notified that they have received a voice message. The audio file is delivered to the target device over the packet-switched network.

With these and other advantages and features of the invention that will become hereinafter apparent, the nature of the invention may be more clearly understood by reference to the following detailed description of the invention, the appended claims and to the several drawings attached herein.

DETAILED DESCRIPTION

Figure 1:
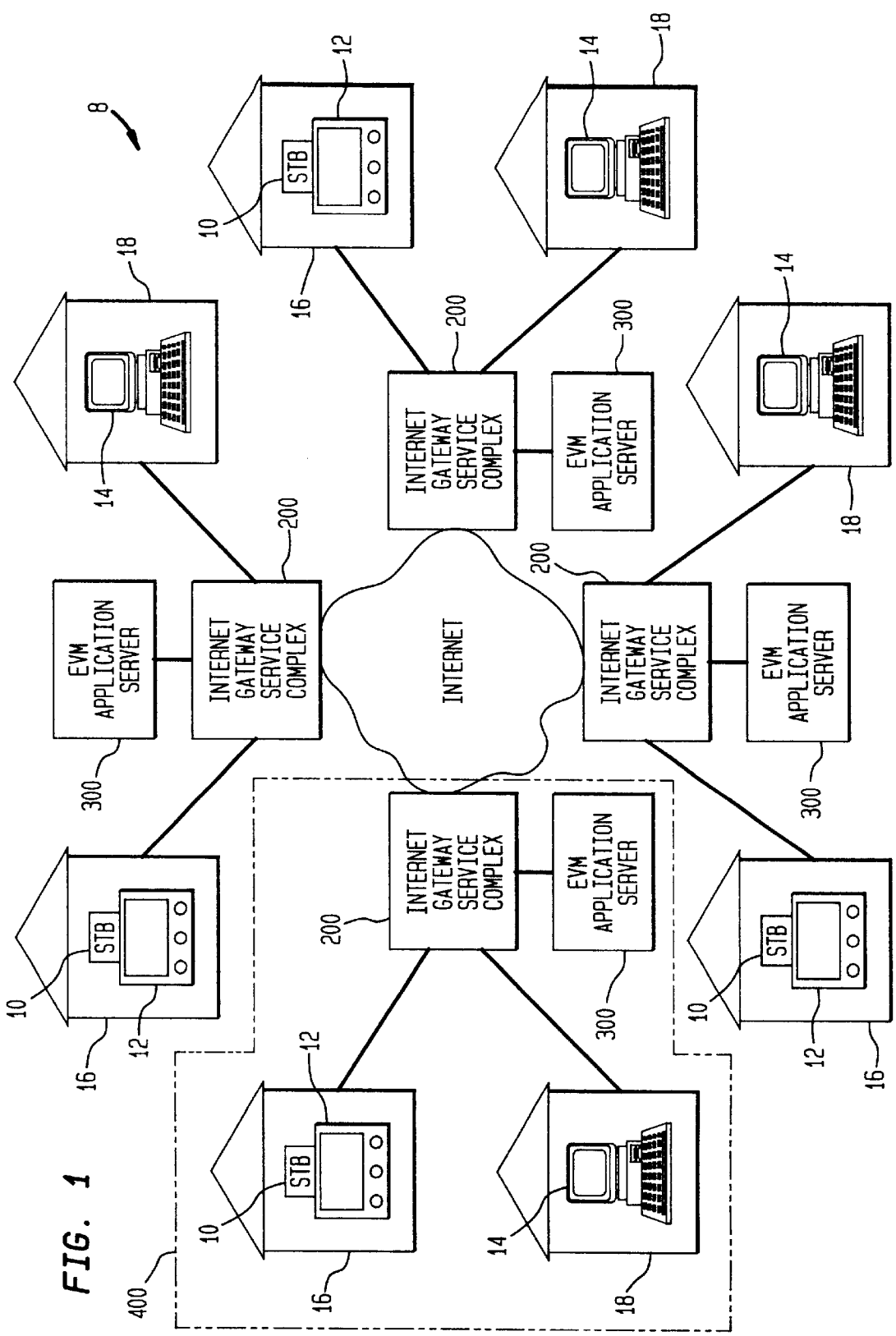
FIG. 1 shows a diagram of an Internet service access system in accordance with a first embodiment of the invention.

In comparing and contrasting electronic mail services and voice mail services, electronic mail services are a much more cost effective form of electronic messaging than voice mail services, but voice mail services are much easier and natural for customers to use than electronic mail services. The present invention integrates electronic and voice mail technologies to create an Electronic Voice Mail (EVM) service.

The technology for enabling packet voice calls in "real time" over the Internet is well-known in the art. These technologies are continuing to mature, but the voice quality which is achievable is significantly less than toll quality and it is not clear that toll quality will ever be achieved unless there are radical changes in Internet infrastructure and network design. To compensate for this, EVM integrates packet voice technology with a client-server architecture and file transfer protocols to allow the development and offering of a low cost voice mail service utilizing Internet infrastructure and technology.

A key aspect of the present invention is to use packet voice technology for one-way, as opposed to a two-way, communication. Further, the invention restricts the use of packet voice technology to direct communications between a client terminal device and a server over one communication link, as opposed to multiple communication links across the Internet. These restrictions are implemented to achieve good voice quality. Another aspect of the present invention is to approach subscribers to an Internet access service as members of a client-server system and to provide a system directory on every a server in every Internet Gateway Service Complex (as described in detail below). This system directory is necessary to make it is easy for client users to address EVM.

Because all of the terminals which will be used to access the EVM service will have a display, the user interface to the EVM service will be visually based and be much more efficient and easy to use than the user interface to traditional voice mail services. Traditional voice mail services require that information and the navigation commands be presented to the user via voice prompts in a serial fashion. Within an EVM service, information and navigation commands will be presented to the user much more quickly via a display. For example, within the EVM service when a user accesses the service the content of the user's mailbox will be displayed to the user. The user will be able to review the message headers in their mailbox and then control the order that they listen to and/or delete or save the messages. The display will also simplify the user interface for features such as message forwarding and the use of distributions lists.

In a first embodiment of the present invention, EVM is developed using a client-server architecture with packet data and voice technologies and delivered to users by Internet access service providers (ISP). EVM is server based, using local application servers to record and store a voice message, and using the Internet to transport the recorded voice message between local servers prior to final delivery of the voice message. EVM utilizes digital voice compression/decompression technology and packet voice transport technology.

EVM provides users with an inexpensive form of voice mail. In essence, EVM provides a voice-enhanced e-mail service to all users subscribing to an Internet access service. Therefore, the primary community of users of the EVM service would be all of the subscribers to the Internet access service, although it would not be limited to this community The first embodiment of EVM is implemented as an application on servers which are located in access gateways to the Internet. An end-user would create an EVM message on a server in their Internet access gateway via a client-server paradigm. Once an EVM message is created, it would be sent as e-mail with a Multipurpose Internet Mail Extension (MIME) attachment via an Internet file transfer protocol to the server in the Internet access gateway of the recipient. The recipient's server would send a message to the recipient's mailbox indicating that EVM has arrived. When the recipient accesses their mailbox and requests to listen to the message, the server would stream out the audio file to the recipient's terminal in real-time. The client software in the terminal would decompress and decode the streaming audio and output the audio to the recipient through a speaker. It is worthy to note that although this embodiment uses the Internet access service model, it can be appreciated that on-line service and other models fall within the scope of the invention.

Referring now in detail to the drawings wherein like parts are designated by like reference numerals throughout, there is illustrated in FIG. 1 a diagram of an Internet access service system in accordance with a first embodiment of the invention. FIG. 1 shows an Internet access service system 8 comprising a plurality of network nodes 400. Each network node 400 comprises an Internet gateway service complex 200 connected to Internet 100 and an EVM application server 300. An Internet TV terminal 16 is connected to Internet gateway service complex 200. Internet TV terminal 16 comprises a set-top box (STB) 10 and a television 12. A personal computer (PC) terminal 18 utilizing a PC 14 may also be connected to service complex 200. Internet access service system 8 has a widespread deployment, i.e., a nationally deployed service offering. An EVM application module 42 (shown in FIG. 4) would reside on EVM application server 300 located in Internet Gateway Service Complex 200. Each subscriber to the Internet access service would have access to the EVM service and would be provided a mailbox for EVM on EVM application server 300 in their local Internet Gateway Service Complex 200. EVM application server 300 in each Internet Gateway Service Complex 200 would maintain or have access to an up-to-date and complete directory of subscribers in the total system. This directory would be used by subscribers in using EVM.

The EVM service, as part of the Internet access service, would be accessible from at least three potential types of terminals: (1) personal computer (PC); (2) network PC (diskless PC designed to operate within a client-server paradigm); and (3) consumer Internet appliance (low cost terminal devices designed to allow consumers to access the Internet). In order to utilize the EVM service, each terminal would be equipped with the following hardware and software: (1) voice coding/decoding software "voice coded" or "voice coder"); (2) client software for transmission and reception of packet voice; (3) a microphone; and (4) a speaker.

One example of a Consumer Internet Appliance is an Internet TV system. In this type of implementation it is advantageous to have a microphone integrated into an infrared remote control to support voice input for the EVM service. It is also advantageous that the speakers in the TV would be used to provide voice output for the EVM service. This set-top box approach will likely provide the lowest cost terminal solution for providing consumers Internet access and access to an EVM service over the Internet.

Figure 2:
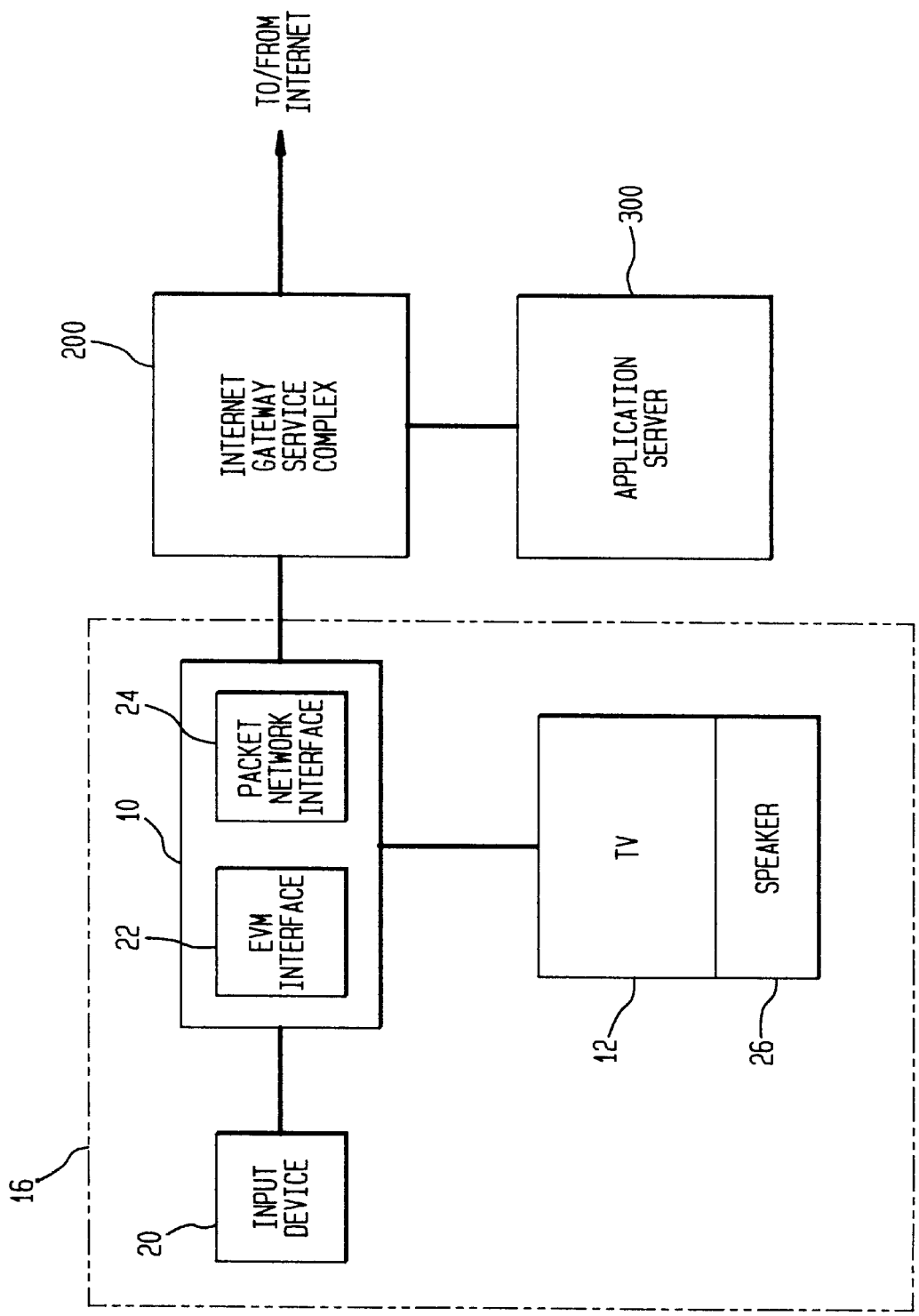
FIG. 2 is a block diagram of an Internet TV terminal employing an EVM device in accordance with one embodiment of the invention.

FIG. 2 is a block diagram of an Internet TV terminal employing an EVM device in accordance with one embodiment of the invention. FIG. 2 shows Internet TV terminal 16 comprising an input device 20, STB 10, TV 12, and a speaker 26. STB 10 further comprises at least an EVM interface 22 and a packet network interface 24.

Input device 20 is used to input analog voice signals into the EVM system. Input device 20 could be, for example, a microphone. Input device 20 is connected to STB 10 via a wired or wireless link. In an advantageous embodiment, a microphone 30 (shown in FIG. 3) is integrated into an infrared remote control to support voice input for the EVM service. Speaker 26 can be the speaker used by TV 12, or a separate speaker, and is used to output the electronic voice message. STB 10 provides Internet access using TV 12 as a display and speaker, and provides the client software and hardware for transmission and reception of packet voice via packet network interface 24.

Figure 3:
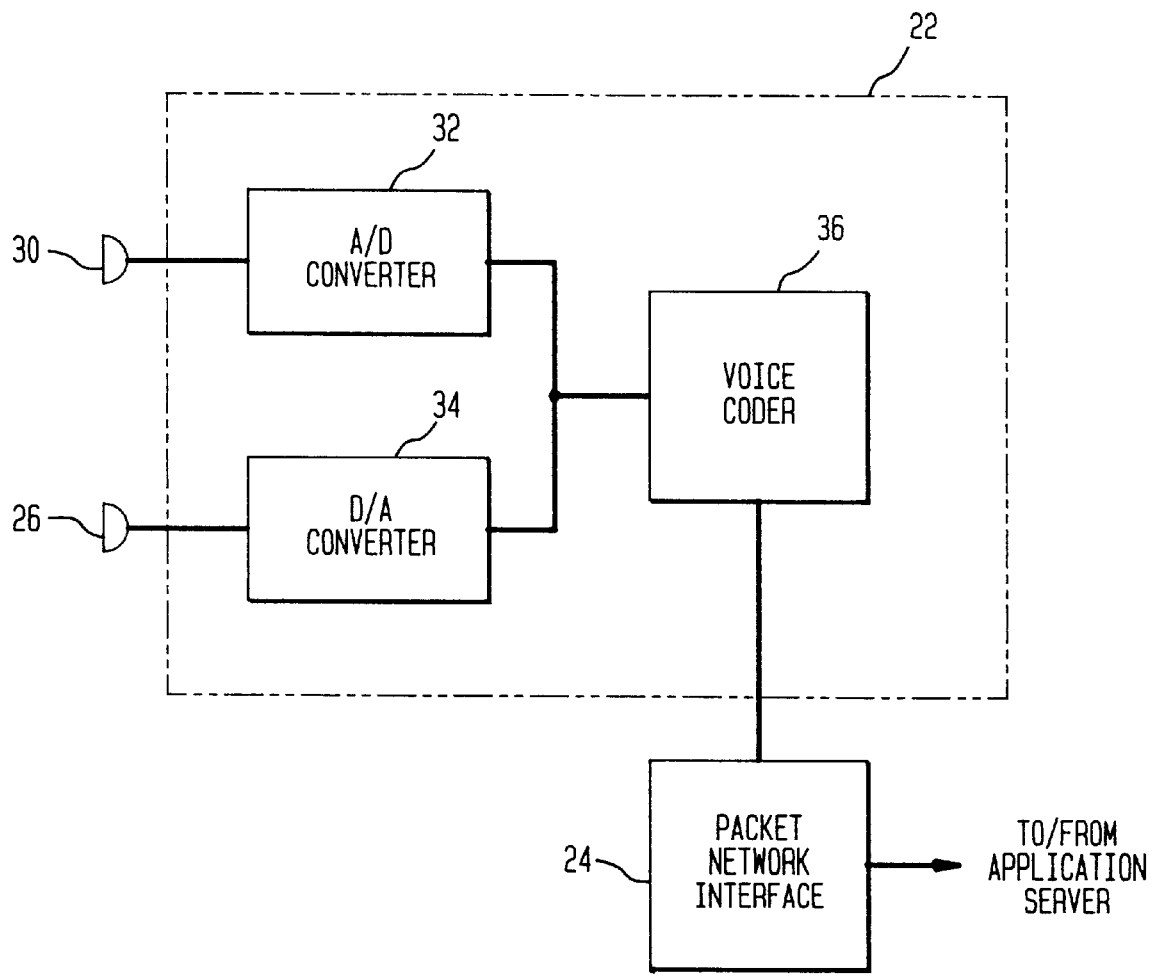
FIG. 3 is a block diagram of an EVM device in accordance with one embodiment of the invention.

FIG. 3 is a block diagram of an EVM interface in accordance with one embodiment of the invention. FIG. 3 shows a microphone 30 connected to an analog-to-digital (A/D) converter 32 located in EVM interface 22. A/D converter 32 is connected to a voice coder 36. Voice coder 36 is connected to packet network interface 24, for transmitting and receiving packets to and from EVM application server 300. FIG. 3 also shows speaker 26 connected to a digital-to-analog (D/A) converter 34, which is in turn connected to voice coder 36.

Microphone 30 is used for inputting voice messages by a subscriber. A/D converter 32 converts analog voice signals to digital voice signals for transport over a digital packet network. Voice coder 36 is used to compress/decompress the digitized voice signals to reduce bandwidth requirements for sending the voice message over the network. D/A converter 34 is used to convert incoming digital voice signals to analog voice signals for output to speaker 26.

Figure 4:
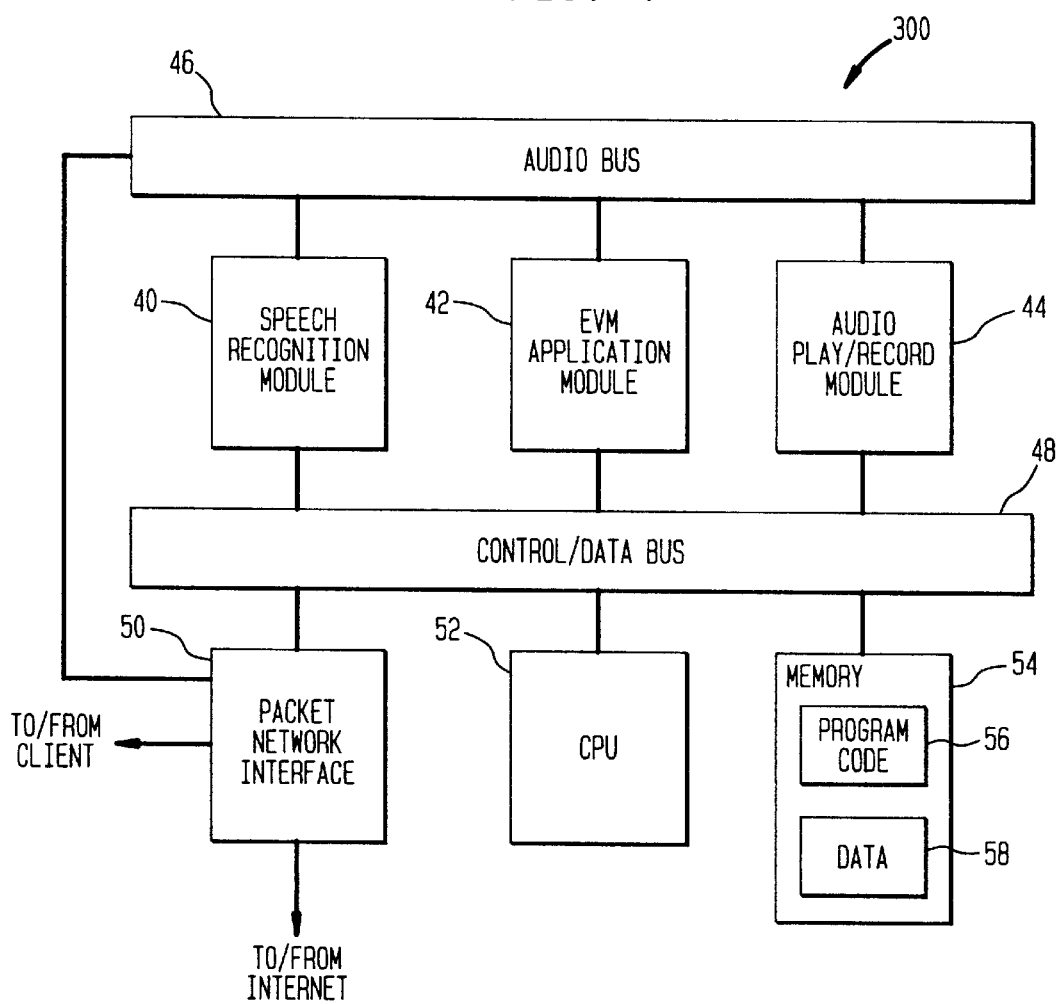
FIG. 4 is a block diagram of an EVM application server in accordance with one embodiment of the invention.

FIG. 4 is a block diagram of an EVM application server in accordance with one embodiment of the invention. It is worthy to note that the term "EVM server" as used herein refers to any network device implementing electronic voice mail functions, of which EVM server 200 shown in FIG. 4 is one example. It can be appreciated, that any such device implementing the basic functionality discussed above for electronic voice mail messages utilizing, at a minimum, a recording component, memory to store a voice mail message, and an EVM application module, falls within the scope of the invention.

As shown in FIG. 4, EVM application server 300 communicates with Internet gateway service complex 200 through a communication link. The EVM application server 300 comprises a speech recognition module 40, an EVM application module 42, and an audio play/record module 44; each of which is connected to an audio bus 46 and a control/data bus 48 as shown in FIG. 4. Further, the EVM application server 300 contains a central processing unit 52, memory unit 54, and a packet network interface 50, each of which is connected to the control/data bus 48.

The overall functioning of EVM application server 300 is controlled by the central processing unit 52. Central processing unit 52 operates under control of executed computer program instructions 56 which are stored in memory unit 54. Memory unit 54 may be any type of machine readable storage device. For example, memory unit 54 may be a random access memory (RAM), a read only memory (ROM), a programmable read only memory (PROM), an erasable programmable read only memory (EPROM), an electronically erasable programmable read only memory (EEPROM), a magnetic storage media (i.e., a magnetic disk), or an optical storage media (i.e., a CD-ROM). Further, EVM application server 300 may contain various combinations of machine readable storage devices, which are accessible by central processing unit 52, and which are capable of storing a combination of computer program instructions 56 and data 58.

Speech recognition module 40 performs speech recognition of speech signals originating at microphone 30 (shown in FIG. 3) and received over audio bus 46. Such speech signals are processed and converted into digital data by speech recognition module 40.

Audio play/record module 44 is used to play audio data received from EVM application server 300, and to record audio data such as a user's voice. It is noted that each module 40, 42 and 44 are shown as separate functional modules in FIG. 4. The functionality of each of modules 40, 42 and 44 may be implemented in hardware, software, or a combination of hardware and software, using well known signal processing techniques. The functioning of each of these modules will be described in further detail below in conjunction with the example.

Packet network interface 50 is used for communications between EVM application server 300 and Internet TV terminal 16, as well as connecting EVM application server 300 to a packet network, such as Internet 100.

The EVM service can be illustrated using the following example. When a subscriber wants to send EVM, the subscriber would access Internet access service system 8 using the lent device such as Internet TV terminal 16. Then, via the service complex, the subscriber can select EVM application module 42 which resides on EVM application server 300. Within the EVM service, EVM application module 42 would prompt the subscriber to address the EVM by selecting the recipient(s) from a subscriber directory stored in memory unit 54 After selecting a recipient(s), EVM application module 42 would prompt the subscriber to select a target device(s) for receiving the message. Target devices for receiving the message include, but are not limited to, PCs Network PCs, and consumer Internet appliances. Once a subscriber(s) and target device(s) are selected, EVM application module 42 would prompt the subscriber to record a message using audio play/record module 44.

Selection of a recipient and target device can be implemented in at least two ways. First, a list of possible recipients and target devices could be listed on the display for TV 12, and the user could scroll through the names and select the desired recipient. This scrolling method could be implemented using a standard or modified TV remote control. For example, a user could use the numeric keypad on a standard TV remote control. Each number from 0 to 9 would be assigned a group of letters, similar to what is currently found on traditional telephone keypads. A user could select the desired recipient by pressing the numbers associated with the letters comprising the recipient's last name, using any well-known name finding technique currently available, for example, for locating an employee on a voice mail system. Alternatively, a user could use the navigation controls found on a standard TV remote control, such as the arrow buttons for increasing volume and/or switching channels. These buttons could be used to control a cursor to facilitate the selection process. A user would simply move the cursor to the desired recipient and/or target device, and press a selection key on the remote control. Another alternative would be to modify a standard TV remote control to include additional keys, or an abbreviated alphanumeric keypad, so that a user could simply type in the name of the recipient and target device.

A second technique would be through the use of speech recognition A user would speak the name of the desired recipient and target device into microphone 30 (shown in FIG. 3). Speech recognition module 40 (shown in FIG. 4) performs speech recognition of speech signals originating at microphone 30 (shown in FIG. 3) and received over audio bus 46. Such speech signals are processed and converted into digital data by speech recognition module 40. The converted digital data could be used to locate the desired recipient and target device from memory unit 54.

Once a recipient and target device are selected, EVM application module 42 prompts the subscriber to record a message using audio play/record module 44. As the subscriber speaks into microphone 30, the subscriber's voice is digitally encoded using A/D converter 32. The digitally encoded voice is compressed by voice coder 36. Voice coder 36 could be any voice coder known in the art which provides a desired data rate while maintaining a desired voice quality, such as residual linear predictive coding (RELP), sub-band coding (SBC), code excited linear predictive coding (CELP), and so forth. The compressed voice signals are then separated into packets and transmitted in real-time (streamed) via the client software in packet network interface 24 in Internet TV terminal 16 to the EVM application server 300 in the local Internet gateway service complex 200 using a packet protocol. This can be accomplished using any well-known technique in the art.

After the voice message has been completed and the EVM audio file has been received by the server and stored in the server's memory or mass storage device, the server transmits the file as a Multipurpose Internet Mail Extension (MIME) attachment to electronic mail. The transfer is accomplished using an Internet file transfer protocol (FTP) over the Internet to the recipient's EVM application server 300 in their local Internet gateway service complex 200. The audio file is stored at the EVM application server 300 located near the recipient, and EVM application module 42 located at EVM application server 300 will send a message waiting indicator such as an e-mail message to the recipient's mailbox indicating that EVM has arrived. When the recipient accesses their mailbox and requests to listen to the voice message, EVM application server 300 will stream out the audio file to the recipient's terminal in real-time using, for example, an audio file transfer protocol. Alternatively, the audio file can be sent as an e-mail attachment to the target device of the recipient. The EVM Interface at the recipient's terminal will decompress the digital signals, convert the decompressed signals to analog signals, and output the audio to the recipient through speaker 26.

Figure 5:
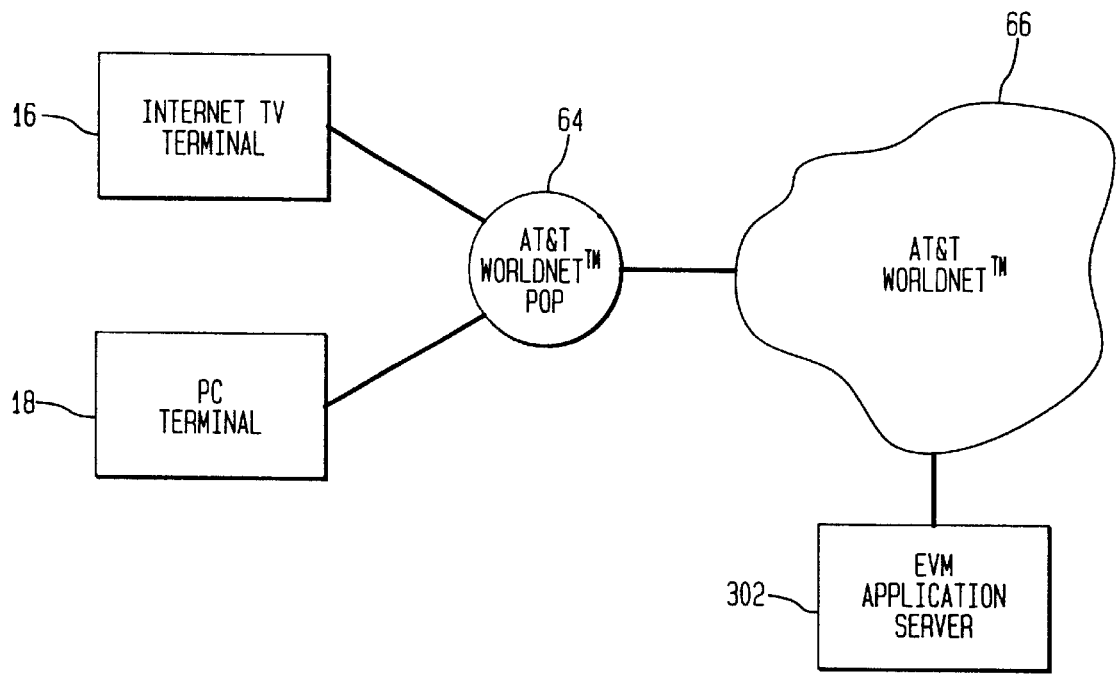
FIG. 5 shows a diagram of an Internet access service system in accordance with a second embodiment of the invention.

FIG. 5 shows a diagram of an Internet access service system in accordance with a second embodiment of the invention. As shown in FIG. 5, Internet TV terminal 16 is connected to an Internet access point such as a WorldNet™ Point-of-Presence (POP) 64. POP 64 connects to a central EVM application server 302 via an ISP such as AT&T WorldNet™ 66. A PC terminal 18 may also be connected to service complex 200.

The second embodiment of the invention works identical to the first, except that a single server is used to centralize EVM services rather than multiple servers. Thus, for example, instead of an audio file being created on a local EVM application server and sent to another local EVM application server via the Internet to be stored in a users mailbox, the audio file could be created and stored in a user mailbox on a central EVM application server, such as EVM application server 302 shown in FIG. 5. When the recipient wants to listen to the audio file, the user would connect to EVM application server 302 to receive the audio file, or alternatively, EVM application server 302 could send the audio file as an e-mail attachment to the recipient. AT&T WorldNet™ Services is one example of an ISP utilizing the type of centralized EVM application server architecture suitable for practicing the present invention.

Although a preferred embodiment is specifically illustrated and described herein, it will be appreciated that modifications and variations of the present invention are covered by the above teachings and within the purview of the appended claims without departing from the spirit and intended scope of the invention. For example, although certain features of the invention are implemented on the client side or server side of the system, it can be appreciated that those same features could be switched to the other side and still remain within the scope of the invention. Thus, for example, although a voice message is recorded in an EVM application server in the embodiments of the invention illustrated above, the voice message could also be recorded at a terminal, e.g., a consumer Internet appliance, and forwarded to the EVM application server. It can also be appreciated that the features of the present invention could be implemented using multiple servers as in the first embodiment, or a centralized server as in the second embodiment and still fall within the scope of the invention as well.

What is claimed is:

1. A method for communicating voice messages, comprising the steps of:
   receiving a recipient and target device selection at an electronic voice mail (EVM) server over a packet-switched network;
   recording a voice message for delivery to said recipient by receiving a voice signal from an input device with a wireless connection to an internet television device;
   storing said voice message as an audio file at said EVM server;
   notifying said recipient of said voice message; and
   delivering said audio file to said target device over said packet-switched network.

2. The method of claim 1, wherein said recipient, available target devices for said recipient, and a delivery address for each of said available target devices for said recipient, are stored in a data dictionary at said EVM server.

3. The method of claim 1, wherein a list of desired recipients and target devices are sent to a client site for display on a screen, and said EVM server receives recipient and target device selections from the client site, the selections being made using the wireless input device.

4. The method of claim 1, wherein said EVM server receives recipient and target device selections via speech commands.

5. The method of claim 1, wherein said audio file is delivered from said EVM server to said target device.

6. The method of claim 1, wherein said audio file is stored at a local EVM server for said recipient prior to delivering said audio file.

7. The method of claim 2, wherein said delivery address is an e-mail address.

8. The method of claim 1, wherein said target device is at least one of a group including PCs, Network PCs, and consumer Internet appliances.

9. The method of claim 1, wherein said voice message recording step further comprises the steps of:
   converting analog voice signals into digital voice signals;
   compressing said digital voice signals;

separating said compressed signals into at least one packet; and transmitting said at least one packet over the network.

10. The method of claim 1, wherein said recipient is notified of said voice message by an e-mail message.

11. The method of claim 1, wherein said audio file is streamed to said target device over said packet-switched network response to a request from said recipient.

12. The method of claim 10, wherein said audio file is attached to said e-mail message and delivered to said target device.

13. The method of claim 1, wherein said audio file is stored at a local EVM server for said client site, and sent as a MIME attachment to an e-mail message sent to said EVM server.

14. The method of claim 1, wherein said audio file is stored at a local EVM server for said client site, and sent as a EVM attachment to an e-mail message sent to a local EVM server for said recipient.

15. An apparatus for communicating voice messages, comprising:

means for receiving a recipient and target device selection at an EVM server over a packet-switched network;

means for sending voice signals to an internet television device via a wireless input device;

means for recording said voice signals to produce a voice message for delivery to said recipient;

means for storing said voice message as an audio file at said EVM server;

means for notifying said recipient of said voice message; and means for delivering said audio file to said target device over said packet-switched network.

16. The apparatus of claim 15, wherein said recipient, available target devices for said recipient, and a delivery address for each of said available target devices for said recipient, are stored in a data dictionary at said EVM server.

17. The apparatus of claim 15, wherein a list of desired recipients and target devices are sent to a client site for display on a screen, and said EVM server receives recipient and target device selections from the client site, the selections being made using the input device with a wireless connection to an internet television device.

18. The apparatus of claim 15, wherein a list of desired recipients and target devices are sent to a client site for display on a screen, and said EVM server receives recipient and target device selections from the client site, the selections being made using the wireless input device.

19. The apparatus of claim 15, wherein said audio file is delivered from said EVM server to said target device.

20. The apparatus of claim 15, wherein said audio file is stored at a local EVM server for said recipient prior to delivering said audio file.

21. The apparatus of claim 16, wherein said delivery address is an e-mail address.

22. The apparatus of claim 15, wherein said target device is at least one of a group including PCs, Network PCs, and consumer Internet appliances.

23. The apparatus of claim 15, wherein said recording means further comprises:

means for converting analog voice signals into digital voice signals;

means for compressing said digital voice signals;

means for separating said compressed signals into at least one packet; and means for transmitting said at least one packet over said packet-switched network.

24. The apparatus of claim 15, wherein said recipient is notified of said voice message by an e-mail message.

25. The apparatus of claim 15, wherein said audio file is streamed to said target device over said packet-switched network response to a request from said recipient.

26. The apparatus of claim 24, wherein said audio file is attached to said e-mail message and delivered to said target device.

27. The apparatus of claim 15, wherein said audio file is stored at a local EVM server for said client site, and sent as a MIME attachment to an e-mail message sent to said EVM server.

28. The apparatus of claim 15, wherein said audio file is stored at a local EVM server for said client site, and sent as a MIME attachment to an e-mail message sent to a local EVM server for said recipient.

29. An apparatus for communicating voice messages, comprising:

a receiver for receiving a recipient and target device selection at an EVM server over a packet-switched network;

a transmitter for sending voice signals to an internet television device via a wireless input device;

a voice message recorder for recording said voice signals to produce a voice message for delivery to said recipient;

memory for storing said voice message as an audio file at said EVM server;

message waiting indicator for notifying said recipient of said voice message; and file transfer protocol for delivering said audio file to said target device over said packet-switched network.

30. The method of claim 1, wherein said voice message is recorded at a client site, and delivered to said EVM server over said packet-switched network.

31. The apparatus of claim 17, wherein said voice message is recorded at a client site, and delivered to said EVM server over said packet-switched network.

32. The method of claim 1, wherein said voice message is recorded at said EVM server.

33. The apparatus of claim 15, wherein said voice message is recorded at said EVM server.

* * * * *